(12) United States Patent
Nakajima

(10) Patent No.: US 7,661,808 B2
(45) Date of Patent: Feb. 16, 2010

(54) IMAGE RECORDING METHOD AND IMAGE RECORDING APPARATUS EMPLOYING THE SAME

(75) Inventor: Atsushi Nakajima, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 528 days.

(21) Appl. No.: 11/661,298

(22) PCT Filed: Aug. 18, 2005

(86) PCT No.: PCT/JP2005/015090

§ 371 (c)(1),
(2), (4) Date: Feb. 22, 2007

(87) PCT Pub. No.: WO2006/025221

PCT Pub. Date: Mar. 9, 2006

(65) Prior Publication Data

US 2008/0192100 A1  Aug. 14, 2008

(30) Foreign Application Priority Data

Aug. 30, 2004  (JP) .............................. 2004-249935

(51) Int. Cl.
*B41J 2/01* (2006.01)
*G01D 11/00* (2006.01)
(52) U.S. Cl. ...................................... 347/102; 347/100
(58) Field of Classification Search .................. 347/100, 347/102
See application file for complete search history.

(56) References Cited

U.S. PATENT DOCUMENTS

| 5,705,247 | A | 1/1998 | Arai et al. |
| 7,527,369 | B2 * | 5/2009 | Hirakawa ................... 347/100 |

FOREIGN PATENT DOCUMENTS

| GB | 2 397 801 | 8/2004 |
| JP | 2000-117960 | 4/2000 |
| JP | 2000-186243 | 7/2000 |
| JP | 2003-191601 | 7/2003 |

(Continued)

OTHER PUBLICATIONS

European Search Report for Patent No. PCT/JP2005015090 mailed Sep. 17, 2007.

(Continued)

*Primary Examiner*—Julian D Huffman
(74) *Attorney, Agent, or Firm*—Cantor Colburn LLP

(57) ABSTRACT

Disclosed in an image recording method comprising the steps of ejecting a first water-based UV curable color ink onto a non-absorptive substrate to form a first color ink image on the non-absorptive substrate, exposing to ultraviolet rays the first color ink image to form a first UV cured color ink image, ejecting a second water-based UV curable color ink onto the first UV cured color ink image to form a second color ink image on the first UV cured color ink image, and exposing to ultraviolet rays the second color ink image to form a second UV cured color ink image, wherein a static contact angle of the second water-based UV curable color ink to the first UV cured color ink image is in the range of from 10 to 50°.

8 Claims, 2 Drawing Sheets

FOREIGN PATENT DOCUMENTS

| | | |
|---|---|---|
| JP | 2004-188891 | 7/2004 |
| JP | 2004-209976 | 7/2004 |
| JP | 2004-263175 | 9/2004 |
| JP | 2004-358782 | 12/2004 |
| WO | 02/38687 | 5/2002 |

OTHER PUBLICATIONS

International Search Report for International Application No. PCT/JP2005/015090 mailed Nov. 22, 2005.

* cited by examiner ns and high chroma are obtained. In this method, the formed cured image is subjected to processing to remove any moisture remaining in the image, wherein the non-volatile solvent is washed with water and dried. Further, it is a main object in this method to adjust wettability of ink droplets ejected onto a recording medium to obtain a preferred ink dot diameter, and the surface treatment of the recording medium is carried out in relation to the object.

IMAGE RECORDING METHOD AND IMAGE RECORDING APPARATUS EMPLOYING THE SAME

CROSS REFERENCE TO RELATED APPLICATIONS

This is a U.S. national stage of application No. PCT/JP2005/015090, filed on 18 Aug. 2005. Priority under 35 U.S.C. §119(a) and 35 U.S.C. §365(b) is claimed from Japanese Application No. 2004-249935, filed 30 Aug. 2004, the disclosure of which is also incorporated herein by reference.

FIELD OF THE INVENTION

The present invention relates to an image recording method recording an image by ultraviolet ray exposure employing a UV curable ink, and an image recording method employing it.

PRIOR ART

In recent years, an ink jet recording method has found wide application in various kinds of graphic art fields such as photography, various kinds of printing, marking and specific printing such as a color filter because of being able to form images easily and inexpensively. Particularly, it has also become possible to obtain image quality comparable to silver salt photograph images by utilizing a recording apparatus which ejects and controls fine dots, ink in which a color reproduction range, durability and ejection suitability have been improved, and exclusive paper in which ink absorption, color forming property of colorants and surface gloss have been greatly improved. Image quality improvement of an ink jet recording method of today has been achieved only when a complete set of a recording apparatus, ink and exclusive paper is prepared.

However, an ink jet system, which requires exclusive paper is problematic in respect to limitation of a recording medium and cost up of a recording medium. Therefore, many attempts have been made which record on a recording medium different from exclusive paper, employing an ink jet recording. Concretely, there are methods such as a phase-conversion ink jet method utilizing wax which is solid at room temperature, a solvent-type ink jet method utilizing an ink which is mainly comprised of a rapid-drying organic solvent and a UV ink jet method in which an ink is cross-linked by ultraviolet (UV) light after recording. Among them, a UV ink jet method has been noted recently in respect to odor relatively lower than that of a solvent-type ink jet method, rapid drying property and capability of recording on a recording medium having no ink absorption.

Solvent-free UV curable inks can form a cured image without bleeding on a recording medium, provide a final image with high durability, and remove any volatile organic solvent (VOC). For example, UV curable ink capable of being ejected from small holes by heating is disclosed in Japanese Patent O.P.I. Publication No. 61-164836, and solvent-free UV curable inks having the same components as above are disclosed in Japanese Patent O.P.I. Publication Nos. 5-214279 and 5-214280, Japanese Translated PCT Patent Publication 2000-504778, WO99/29787 and WO99/2788. As a composition for a UV curable ink employing water as the solvent, a water-based photocurable resin composition is proposed which contains a polymerizable compound having in the molecule two or more polymerizable functional groups and one or two anionic functional groups (see for example Patent Documents 1 and 2 described later). These inks are free from problem that VOC volatilizes, less in ink rise after curing, and less limited to their physical properties on ejecting. Solvent-free UV curable inks can form a cured image without bleeding, and provide a final image with high quality and high performance. However, it has been proven that a water-based ink employing the water-based photocurable resin composition has problems in that ink stability, wettability of the ink to the recording medium, or smoothness of formed images is insufficient, and quality of images decreases during continuous printing over a long time.

An ink jet printing method forming a monochromatic solid image on a recording medium employing a water-based ink containing a water-soluble photopolymerizable compound and a water-soluble photopolymerization initiator is proposed, in which the static contact angle of water to the recording medium surface is not more than 60°, and the volume per unit area of ink necessary to form the monochromatic solid image and the volume of ink which the recording medium can absorb are limited to a specific value (see for example Patent Document 3 described later). According to the Patent Document 3, the ink jet printing method is realized in which the formed cured image has strong adhesion to a recording medium, and when a transparent recording medium is used, prints with high transparency are obtained, while when a reflective recording medium is used, prints with high glossiness and high chroma are obtained. In this method, the formed cured image is subjected to processing to remove any moisture remaining in the image, wherein the non-volatile solvent is washed with water and dried. Further, it is a main object in this method to adjust wettability of ink droplets ejected onto a recording medium to obtain a preferred ink dot diameter, and the surface treatment of the recording medium is carried out in relation to the object.

The method disclosed in Patent Document 3 has problems described below.

As one method for attaining the limitations defined above, additional surface treatment of a recording medium is necessary. In this method, after printing by plural scans is carried out to form a final image, the formed image is exposed to ultraviolet ray irradiation. Accordingly, in the solid image formed from a large amount of ink, many ink droplets are joined together to form an image with high smoothness and high glossiness, but bleeding occurs in dots. In order to prevent the bleeding in dots, there is a method in which ink droplets are intermittently ejected onto a recording medium and serial ultraviolet ray irradiation is carried out to fix the ink. However, this method has still problems in that glossiness, density and chroma in the solid image are lowered.

Patent Document 1: Japanese Patent O.P.I. Publication No. 2000-186243 (SCOPE OF THE CLAIMS)

Patent Document 2: Japanese Patent O.P.I. Publication No. 2002-187918 (SCOPE OF THE CLAIMS)

Patent Document 3: Japanese Patent O.P.I. Publication No. 2000-117960 (SCOPE OF THE CLAIMS)

DISCLOSURE OF THE INVENTION

Problems to be Solved by the Invention

The present invention has been made in view of the above. An object of the invention is to provide an image recording method which provides an image with excellent anti-bleeding property, high adhesion to a substrate, high glossiness, high density and high chroma, and to provide an image recording apparatus employing the image recording method.

Means for Solving the Above Problems

The above object of the invention can be attained by the following constitutions:

1. An image recording method comprising the steps of ejecting a first water-based UV curable color ink onto a non-absorptive substrate to form a first color ink image on the non-absorptive substrate, exposing to ultraviolet rays the first color ink image to form a first UV cured color ink image, ejecting a second water-based UV curable color ink onto the first UV cured color ink image to form a second color ink image on the first UV cured color ink image, and exposing to ultraviolet rays the second color ink image to form a second UV cured color ink image, wherein a static contact angle of the second water-based UV curable color ink to the first UV cured color ink image is in the range of from 10 to 50°.

2. The image recording method of item 1 above, wherein formation of the first and second color ink images is carried out by one printing scan.

3. The image recording method of item 1 above, wherein when the ink amount necessary to form a solid image is 100%, the total amount of the first and second UV curable color inks is less than 100%.

4. The image recording method of item 1 above, wherein an image area ratio of the first UV cured color ink image is less than 100%.

5. The image recording method of item 1 above, further comprising the step of drying the second UV cured color ink image to remove moisture remaining therein.

6. The image recording method of item 1 above, further comprising the steps of ejecting a water-based UV curable colorless ink onto the second UV cured color ink image to form a colorless ink image on the second UV cured color ink image, and exposing to ultraviolet rays the colorless ink image.

7. The image recording method of item 6 above, comprising the steps of ejecting a first water-based UV curable color ink onto a non-absorptive substrate to form a first color ink image on the non-absorptive substrate, exposing to ultraviolet rays the first color ink image to form a first UV cured color ink image, ejecting a water-based UV curable colorless ink onto the first UV cured color ink image to form a colorless ink image on the first UV cured color ink image, and exposing to ultraviolet rays the colorless ink image.

8. The image recording method of item 1 above, wherein the first water-based UV curable color ink is the same as the second water-based UV curable color ink.

PREFERRED EMBODIMENT OF THE INVENTION

Figure 1:
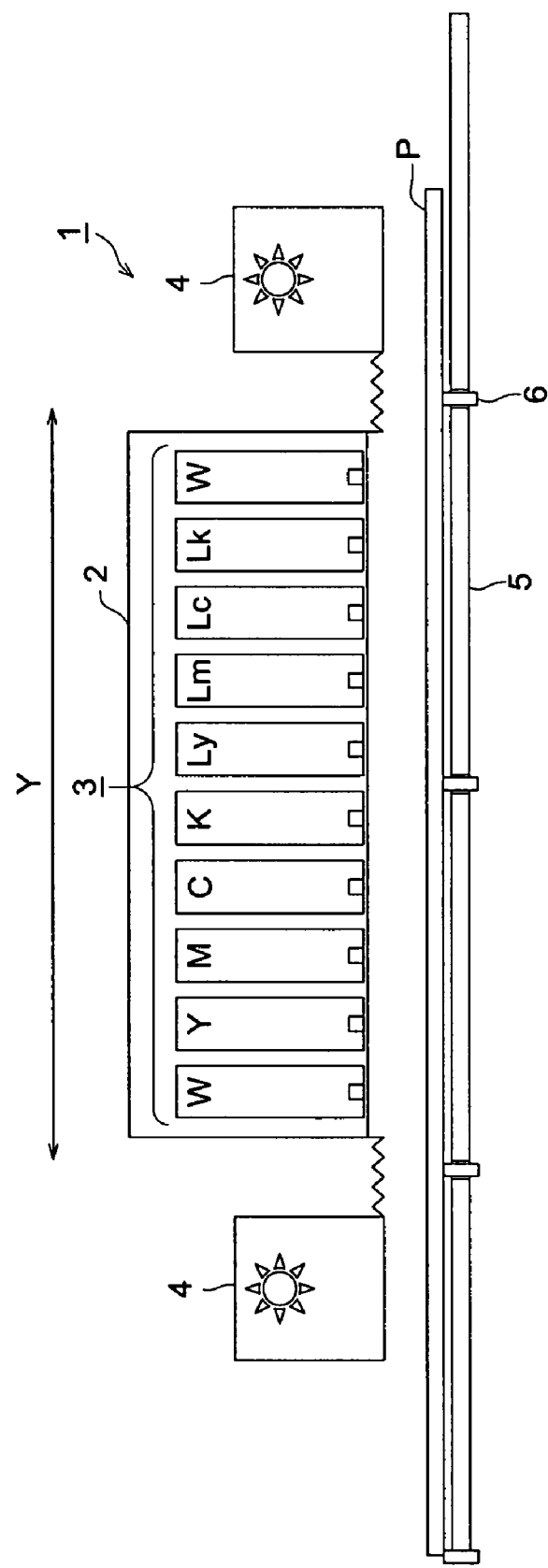
FIG. 1 is an ink jet recording apparatus used in the image recording method of the invention and shows a front view of one embodiment of the main section used in a serial printing process.

Preferred embodiment of the invention will be explained below.

The present inventor has an extensive study on the above problems. As a result, the present inventor has found that an image recording method, repeating several times a cycle including the steps of ejecting a water-based UV curable color ink onto a non-absorptive substrate to form a color ink image on the non-absorptive substrate, and exposing to ultraviolet rays the color ink image to form a UV cured color ink image, can provide an image with excellent anti-bleeding property, good adhesion to a substrate, high glossiness, high density and high chroma, in which another water-based UV curable color ink is ejected onto the UV cured color ink image, wherein a static contact angle of the another water UV curable color ink to the UV cured color ink image is from 10 to 50°, and has completed the invention.

The present invention will be detailed below.

The image recording method of the invention repeats several times a cycle including the steps of ejecting a water-based UV curable color ink onto a non-absorptive substrate to form a color ink image on the non-absorptive substrate, and exposing to ultraviolet rays the color ink image to form a UV cured color ink image. When an image is formed by plural scans, UV irradiation is carried out every scan, not after all printing is completed. The above image recording method can prevent effectively bleeding, secure curing of the formed image by ultraviolet ray irradiation per scan, and increase image adhesion to the substrate.

The image recording method of the invention is characterized in that when plural scans are carried out, ultraviolet ray irradiation per scan is carried out, and a second UV curable color ink is ejected onto a first cured color ink image formed previously by ejecting a first UV curable color ink onto a substrate to form a first color ink image, and exposing to ultraviolet rays the first color ink image, the contact angle of the second UV curable color ink to the first cured color ink image is in the range of from 10 to 50°. The method for obtaining the range of the contact angle as defined above is not specifically limited, but kinds of UV curable color ink or ultraviolet ray irradiation condition are optimally selected so that the contact angle of as defined above is in the range as described above.

In the invention, when the contact angle of ink to a cured image is adjusted to be in the range as described above, bleeding is minimized, and a solid image with high glossiness or an image with high density and high chroma is obtained.

In the invention, a method to adjust the contact angle as defined above to be in the range of from 10 to 50° is not specifically limited, but there is, for example, a method which adjusts an irradiation amount of ultraviolet rays used for curing an ink image every scan. The irradiation amount of ultraviolet rays is preferably not less than 10 mJ/cm$^2$, and more preferably not less than 50 mJ/cm$^2$. The irradiation amount of ultraviolet rays is preferably not more than 10,000 mJ/cm$^2$, and more preferably not more than 5,000 mJ/cm$^2$.

Further, there is a method which optimizes conditions under which ultraviolet ray irradiation is carried out, for example, temperature, humidity and oxygen concentration. On ultraviolet irradiation, the temperature is preferably from 15 to 50° C., the humidity is preferably from 20 to 70% RH, and the oxygen concentration is preferably not more than $4.5 \times 10^{-3}$ mol/L. The less the oxygen concentration is, the better. The oxygen concentration, although it has no lower limit, is preferably from $5 \times 10^{-6}$ to $4.5 \times 10^{-3}$ mol/L, in view of cost performance or apparatus structure for shielding oxygen.

As a method for obtaining the preferred oxygen concentration, there is a method in which the ink ejection section, its vicinity and space above the substrate including the substrate surface to be exposed to ultraviolet rays are closed and the oxygen concentration in the space is reduced according to a conventional method, for example, a method in which air in the closed space is substituted with nitrogen or inert gas. Herein, these gases can be supplied from a compressed-gas cylinder. Nitrogen, which is filtered through activated carbon or a filter to remove impurities, can be also used. Intended effects can be obtained by supplying, to the closed space above, oxygen free air filtered through activated carbon or a filter. In the invention, the space described above cannot be completely closed, since a recording substrate is transported in the space. Accordingly, when continuous printing is carried out, it is preferred that inert gas is continuously or intermittently supplied to the space.

In order to adjust surface tension of ink or surface energy of cured ink, surfactants or appropriate solvents are preferably used.

The surfactants used in the invention include known anionic surfactants, cationic surfactants, nonionic surfactants and betaine type surfactants. Among these, nonionic surfactants are preferred.

As the nonionic surfactants used in the invention, there are a polyoxyethylene-polyoxypropilene condensate, polyoxyethylene lauryl ether, a secondary alcohol ethoxylate, a primary alcohol ethoxylate, a nonylphenol ethoxylate, an octylphenol ethoxylate, an oleyl alcohol ethoxylate, a lauryl alcohol ethoxylate, polyethylene glycol, polyoxyethylene glycol oleate, sorbitan stearyl ester, sorbitan oleyl ester, polyoxyethylene sorbitan oleyl ester, or an acryl copolymer of a hydroxyl group-containing unsaturated monomers such as 2-hydroxyethyl methacrylate, 4-hydroxybutyl acrylate, and a polyethylene glycol monomethyl ether. Further, listed are alcohols such as isopropyl alcohol, n-butyl alcohol, propylene glycol monomethyl ether, and propylene glycol monobutyl ether and glycol ethers. These nonionic surface active agents may be used alone or a mixture of two or more kinds thereof.

The nonionic surfactant content of ink is preferably from 10 to 10,000 ppm, and more preferably from 20 to 1,000 ppm. Ink having a nonionic surfactant content of less than 10 ppm cannot attain the object of the invention, while ink having a nonionic surfactant content exceeding 10,000 ppm tends to lower weather resistance at ink image.

In the invention, the nonionic surfactant is preferably a fluorine-containing surfactant having a perfluoroalkyl group in the molecule. Examples of the fluorine-containing surfactant having a perfluoroalkyl group in the molecule include a perfluoroalkyl ethylene oxide addition product, a perfluoroalkylamine oxide, and a perfluoroalkyl containing oligomer, specifically, for example, SURFLON S-141, SURFLON S-145, SURFLON S-381, SURFLON S-383, SURFLOM S-393, SURFLON SC-101, SURFLON SC-105, SURFLON KH-40 and SURFLON SA-100 (each being products of SEIMI CHEMICAL Co., Ltd.), and MEGAFAC F-171, MEGAFAC F-172, MEGAFAC F-173, MEGAFAC F-177, MEGAFAC F-178A, MEGAFAC F-178K, MEGAFAC F-179, MEGAFAC F-183, MEGAFAC F-184, MEGAFAC F-185, MEGAFAC F-470, and MEGAFAC F-471 (each being products of DAINIPPON INK AND CHEMICALS, INCORPORATED) (see reference literature; Chemical Products 13,700, pp. 1,239-1,242, The Chemical Daily, Co., Ltd. (2000)). The fluorine-containing surfactant having a perfluoroalkyl group in the molecule may be used alone or as a mixture of two or more kinds thereof.

In the ink used in the invention, water or a mixture of water and an organic solvent is used. Examples of a water miscible organic solvent preferably used in the ink in the invention include alcohols (for example, methanol, ethanol, propanol, iso-propanol, butanol, iso-butanol, sec-butanol, tert-butanol, pentanol, hexanol, cyclohexanol, benzyl alcohol, etc.); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.); polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, tripropylene glycol dimethyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, etc.); amides (for example, formamide, N,N-dimethylformamide, N,N-dimethylacetamide, etc.); heterocycles (for example, 2-pyrrolidone, N-methyl-2-pyrrolidone, N-cyclohexyl-2-pyrrolidone, 2-oxazolidone, 1,3-dimethyl-2-imidazolidinone, etc.); sulfoxides (for example, dimethylsulfoxide, etc.); sulfones (for example, sulfolane, etc.); sulfonic acid salts (for example, sodium 1-butane sulfonate, etc.); urea; acetonitrile; and acetone. As the water miscible organic solvent, polyhydric alcohols are preferred, and a combination of polyhydric alcohol and polyhydric alcohol ethers is more preferred.

In the invention, a method measuring static contact angle of a second UV curable color ink to the surface of an ink image formed from a first UV curable color ink is carried out as follows:

A solid image is formed on a substrate employing the first ink and cured to form a cured solid image, and the second ink is dropped on the resulting cured solid image to form a second ink drop. After that, the contact angle of the second ink drop is measured through an automatic contact angle meter MODEL CA-V, produced by Kyowa Interface Science Co., Ltd.

In the image recording method of the invention, when the ink amount (the minimum ink amount necessary to cover the entire surface of the substrate) necessary to form a solid color image from a UV curable color ink is 100%, the total amount of UV curable color ink used for forming an image is preferably less than 100%.

This means that when the minimum ink amount necessary to cover the entire surface of the substrate and form a solid image is defined as 100%, the total amount of ink, which is ejected on a substrate through one scan and cured through UV irradiation, is less than 100%. For example, when an image is formed from four different color inks, the total amount of the four different color inks is less than 100%. An image formed under such a condition is free from bleeding, and has high glossiness, high density and high chroma.

A method for forming an image under the conditions described above is not specifically limited, but there is, for example, an interleave method, in which ink is intermittently ejected and deposited on a substrate, followed by ultraviolet ray irradiation.

There are several ultraviolet ray irradiation methods, such as a method in which UV irradiation is carried out every time an image of one color is formed in a line recording method, and a method in which when recording is made employing plural recording heads containing one color ink, UV irradiation is carried out per one recording head. In the invention, these methods can be used singly or in combination.

In the image recording method of the invention comprising ejecting ink onto a substrate to form an image and curing the image, the ratio of the cured image area to the substrate area (hereinafter referred to as image area ratio or simply as image ratio) is preferably less than 100%. That is, it is preferred that an ink image, with which the entire surface of the substrate is not completely covered, is exposed to ultraviolet rays. The image ratio is more preferably less than 90%, and still more preferably from 0 to less than 90%.

When an ink image, with which the entire surface of the substrate is not completely covered, is exposed to ultraviolet rays, the exposure can be carried out sufficiently and efficiently, greatly improving adhesion of the image to the substrate.

As a method of ejecting ink so that the image ratio as defined in the invention is less than 100%, a method of ejecting ink intermittently such as the interleave method or ink limitation is preferred. The image ratio depends upon the surface energy of the substrate, and further, the diameter of ink drop ejected onto the substrate varies. In order to obtain the intended image ratio, it is preferred that a method selecting an appropriate substrate, a method employing a solvent or surfactant to optimize the surface tension of ink, a method shortening UV ray irradiation time or their combination is appropriately carried out.

As a method of determining the image ratio defined in the invention, there is a method of ejecting ink onto a substrate to form an image on the substrate, exposing to ultraviolet rays the image to form a cured image, reading image data of the resulting cured image through a CCD monitor, and determining the image ratio from the image data.

In the image recording method of the invention, a method is preferred which comprises forming a UV curable color ink image on a substrate, exposing to ultraviolet rays the ink image to form a cured ink image, and drying the cured ink image to remove moisture remaining therein, which improves adhesion of the image to the substrate and storage stability of the image. In the image recording method of the invention, repeating several times a cycle of forming an ink color image and exposing to ultraviolet rays the ink color image to form a cured color image, drying may be carried out after every cycle is completed or after all cycles are completed.

As heating methods used for the drying in the invention, there are a heating method employing hot water, a heating method employing a heater or a heated coil, a convection heating method employing a dryer, and a radiant heating method employing electromagnetic waves such as infrared rays or high frequency waves.

In the image recording method of the invention is preferred a method comprising the steps of ejecting a UV curable color ink onto a substrate to form an image, ejecting a water based UV curable colorless ink onto the image to form a colorless ink image, and exposing to ultraviolet rays the colorless ink image or a method comprising the steps of ejecting a UV curable color ink onto a substrate to form an image, ejecting a water based UV curable colorless ink onto the image to form a colorless ink image ink, and then exposing to ultraviolet rays the colorless ink image. This method provides an image with high density, glossiness and chroma.

In the image recording method of the invention repeating a cycle of forming an image and exposing it to ultraviolet rays to form a cured image, the steps of ejecting a water based UV curable colorless ink onto a color image to form a colorless ink image and exposing to ultraviolet rays the colorless ink image may be carried out after every one cycle is completed or after all the cycles are completed. As a method for forming the colorless ink image, there are a method employing a colorless ink ejecting section which is provided in the ink jet recording head for ejecting a UV curable color ink, a method employing a colorless ink ejecting section which is provided in another ink jet recording head, a coating method, and a printing method.

The colorless ink in the invention is an aqueous UV curable colorless ink which contains a photopolymerizable compound, a photopolymerization initiator and a polymerization inhibitor, and does not substantially contain pigments (or colorants). Herein, ink, which does not substantially contain colorants, is ink containing no colorants or ink containing colorants in an amount of less than 0.1% by weight.

Next, an ink jet recording apparatus used in the image recording method of the invention (hereinafter also referred to as recording apparatus) will be explained suitably in reference to a drawing. Herein, the recording apparatus of the drawing is one embodiment of a recording apparatus of the invention, and the image recording method of the invention is not limited to the drawing.

FIG. 1 is one embodiment of an ink jet recording apparatus used in the image recording method of the invention and shows a front view of the main section of the ink jet recording apparatus employing a serial printing process. Recording apparatus 1 is equipped with head carriage 2, recording head 3, irradiation means 4 and platen portion 5.

Figure 2:
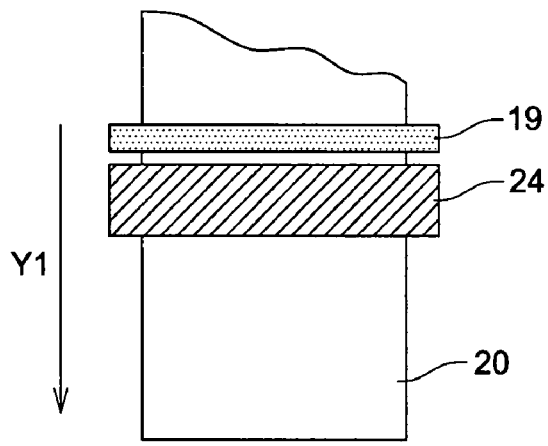
FIG. 2 is a schematic diagram showing embodiment of an ink jet printing process used in the invention.
Figure 2:
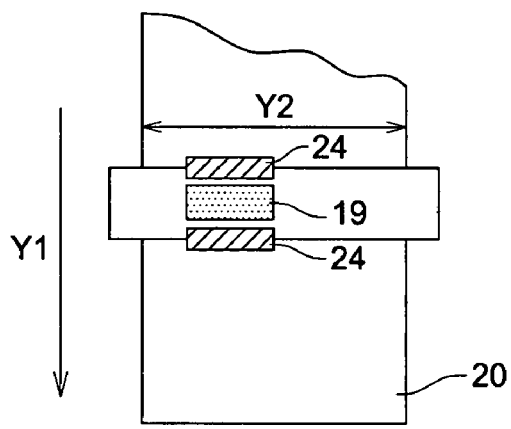
Figure 2:
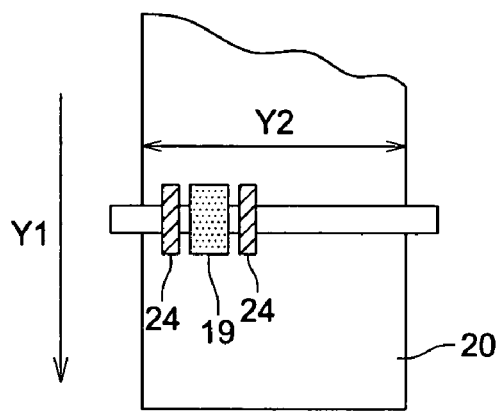

Recording sheet P is guided by guide member 6 to be moved to the back side from the front side in FIG. 2 by operation of a transport means (not illustrated). Scan of recording heads 3 held in the head carriage 2 is made by reciprocating head carriage 2 in the Y direction in FIG. 1 according to a head scanning means (not illustrated).

Head carriage 2 is provided over recording sheet P, and stores recording heads 3 described below with the ink ejection outlets arranged downward, the number of recording heads 3 being the same as that of different color inks used in an ink image formed on the recording sheet. Head carriage 2 is provided in the main body of recording apparatus 1 so as to reciprocate in the Y direction shown in FIG. 1 by a drive of a head scanning means.

Herein, FIG. 1 illustrates that head carriage 2 is supposed to store recording heads 3 each containing a white ink composition W, a yellow ink composition Y, a magenta ink composition M, a cyan ink composition C, a black ink composition K, a light yellow ink composition Ly, a light magenta ink composition Lm, a light cyan ink composition Lc, a light black ink composition Lk and a white ink composition W, however, the number of recording heads 3 stored in head carriage 2 in practical operation is suitably determined. The head carriage 2 can store recording head containing another ink, for example, a colorless ink in the invention.

Recording heads 3 eject a UV curable color ink to be supplied by means of an ink supplying means (not illustrated) from the ink ejection outlets onto recording sheet P by action of plural ejecting means (not illustrated) equipped in the recording apparatus. The UV curable color ink to be ejected from recording heads 3 contains a colorant, a polymerizable compound and a photopolymerization initiator and is cured by UV irradiation in which crosslinking reaction or polymerization is caused by catalytic action of the photopolymerization initiator.

The recording heads 3 eject the UV curable ink as ink droplets onto a pre-determined region (a region capable of receiving the ink) of recording sheet P while the scan of the head is made in which the head moves from one edge to another of the recording sheet in the Y direction in FIG. 1 by drive of the head scanning means, whereby the ink is deposited on that region of the recording sheet.

The above scan is suitably made several times to eject ink onto one region of recording sheet. After that, while the recording sheet P is transported from the front side to the back side of the page in FIG. 1 by a transport means and the scan of the recording heads 3 is again made by the head scan means, the UV curable ink is ejected from the recording heads onto a region adjacent to the one region of the recording sheet transported to the back side of the page.

The above operation is repeated, whereby the UV curable ink is ejected from recording heads 3 employing the head scan means and the transport means to form an image comprised of aggregates of ink droplets on recording sheet P.

Irradiation means 4 is equipped with a UV lamp which emits ultraviolet ray with a specific wavelength region at a stable exposure energy and a filter which transmits ultraviolet ray with a specific wavelength. Herein, Examples of the UV lamp include a mercury lamp, a metal halide lamp, an excimer laser, a UV laser, a cold cathode tube, a black light, and an LED, and a metal halide lamp tube, a cold cathode tube, a mercury lamp tube and a black light, having a band-shape, are preferable. A lamp capable of adjusting intensity (mW) of exposure is especially preferred as a light source.

The recording apparatus of FIG. 1 employing a serial printing process is explained in the above. In the invention, an ink jet recording apparatus employing a printing process as shown in FIG. 2 can be used.

FIG. 2a) shows a printing process (a line head process) comprising forming an image on recording sheet 20 through recording heads 19 provided in the width direction of recording sheet 20, while the recording sheet is transported in the direction $Y_1$, and exposing to actinic rays the image through irradiation means 24, FIG. 2b) shows a printing process (a flathead process) comprising forming an image on recording sheet 20 through recording heads 19 while recording heads 19 are transported in the sub-scanning direction $Y_2$ (in the width direction of the recording sheet) and the recording sheet is transported in the direction $Y_1$, and exposing to actinic rays the image through irradiation means 24, and FIG. 2c) shows a printing process (a serial printing process) comprising forming an image on recording sheet 20 through recording heads 19 while recording heads 19 are transported in the sub-scanning direction $Y_2$ (in the width direction of the recording sheet) and the recording sheet is transported in the direction $Y_1$, and exposing to actinic rays the image through irradiation means 24 provided on both sides of the recording heads 19. In the invention, any of these processes can be used.

In the image recording method of the invention, a means for adjusting amount of ultraviolet ray irradiation is preferably a means for varying regions of ultraviolet ray irradiation or a means for varying intensity of ultraviolet ray irradiation.

In the invention, intensity of ultraviolet ray irradiation can be represented in terms of mW, which means effective energy per unit time (1 second) of ultraviolet rays irradiated to recording sheet.

In the invention, intended intensity of ultraviolet ray irradiation can be obtained by an appropriate combination of a method varying regions of ultraviolet ray irradiation, a method varying the number of light sources used for irradiation, and a method varying power supplied to the light sources.

The ink jet recording method or ink jet recording apparatus, where plural image recording speeds can be applied, preferably has a means for keeping constant the amount of ultraviolet ray irradiation irradiated per unit area of recording sheet, regardless image recording speeds.

In the image recording method of the invention, it is preferred that actinic ray is irradiated 0.001 to 2.0 seconds after ink has been deposited on recording sheet, and it is more preferred that actinic ray is irradiated 0.001 to 1.0 second after ink has been deposited on recording sheet. It is specifically important that the irradiation timing be as early as possible in order to form an image with high resolution.

As the recording substrate used in the image recording method of the invention, a non-absorptive recording sheet is preferred. In the invention, the non-absorptive recording sheet does not absorb ink. In the invention, the non-absorptive recording sheet is defined as one whose ink transfer amount is less than 0.1 ml/m$^2$ or substantially 0 ml//m$^2$, measured according to a Bristow method.

The Bristow's method in the invention is one which determines liquid absorption behavior of paper and paperboard within a short time. In more detail, determination is made in accordance with Liquid Absorption Test Method of Paper and Paperboard (the Bristow's method) of J. TAPPI Paper Pulp Test Method No. 51-87, and determined values are represented by an ink transfer amount (in ml/m$^2$) within a contact time of 40 millisecond. Further, in the above test method, employed is pure water (ion-exchanged water). However, in order to discriminate an area to be determined, an aqueous solution containing a water-soluble dye in an amount of less than 2% can be employed.

As a non-absorptive recording sheet used in the invention, besides water-proof coated paper sized, various non-absorptive plastics or their films, which are used in a so-called light packaging, can be utilized. Examples of the plastic films include for example, a PET film, an OPS film, an OPP film, an ONy film, a PVC film, a PE film and a TAC film. As plastic films other than these, polycarbonate, acryl resin, ABS, polyacetal, PVA and a rubber series can be utilized. A metal series and a glass series are also applicable. Among these recording sheets, one having a surface energy of from 35 to 60 mJ/m$^2$, and preferably from 40 to 60 mJ/m$^2$ is preferred.

The UV curable color ink employing in the image recording method of the invention contains water, a polymerizable compound polymerizing upon ultraviolet ray exposure and an aqueous photopolymerization initiator producing radicals upon ultraviolet ray exposure, in addition to a colorant.

The polymerizable compound polymerizing upon ultraviolet ray exposure will be explained below.

The polymerizable compound used in the invention is preferably a water-soluble polymerizable compound, for example, a compound having in the molecule an acidic group and a (meth)acryloyl group or a vinyl group. Examples of such a compound include an ester of succinic anhydride and 2-hydroxyethyl(meth)acrylate, an ester of ortho-phthalic anhydride and 2-hydroxyethyl(meth)acrylate, and vinylnaphthalene sulfonic acid.

As a water-soluble compound having in the molecule two polymerizable groups produced industrially, there is a compound modified with polyethylene oxide and made hydrophilic. Examples of such a polyethylene oxide modified compound include a polyhydric alcohol(meth)acrylate such as diethylene glycol di(meth)acrylate or tetraethylene glycol di(meth)acrylate. Further, as the preferred water-soluble polymerizable compound, there are a polyfunctional water-soluble polymerizable compound disclosed in Japanese Patent O.P.I. Publication No. 8-165441, a hydrophilic epoxide(meth)acrylate derived from glycerin disclosed in Japanese Patent O.P.I. Publication No. 2000-117960, and a polyfunctional cationic acryl monomer disclosed in U.S. Pat. No. 5,612,388.

As preferred examples of the water-soluble polymerizable compound, there are hydrophilic polyfunctional polymerizable compounds as listed below. These compounds are highly hydrophilic, water-soluble, high in polymerization rate and low in viscosity. The viscosity of an aqueous solution containing these compounds is far lower than that of an aqueous solution containing a conventional compound.

As the polymerizable compound polymerizing upon light exposure, there is a water-soluble polymerizable compound selected from compounds represented by the following formulae A1 through A11 and compounds represented by the following formulae B1 through B4.

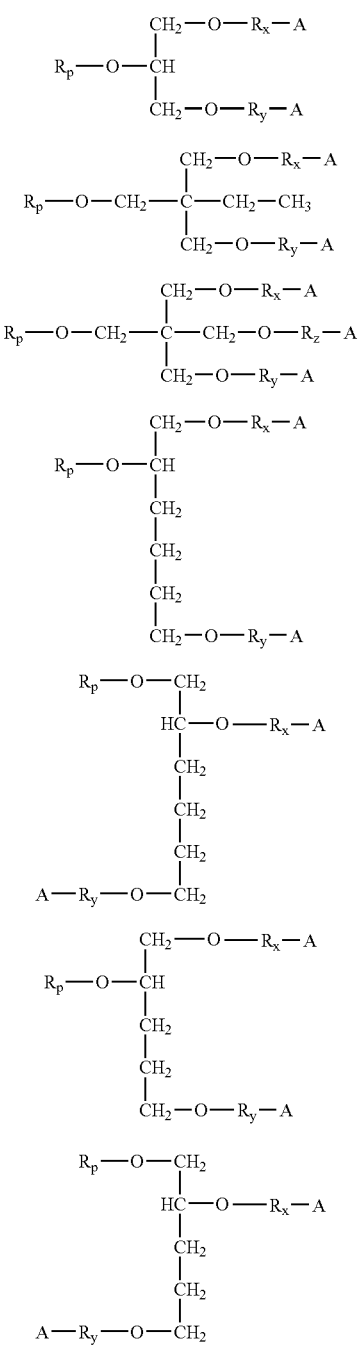

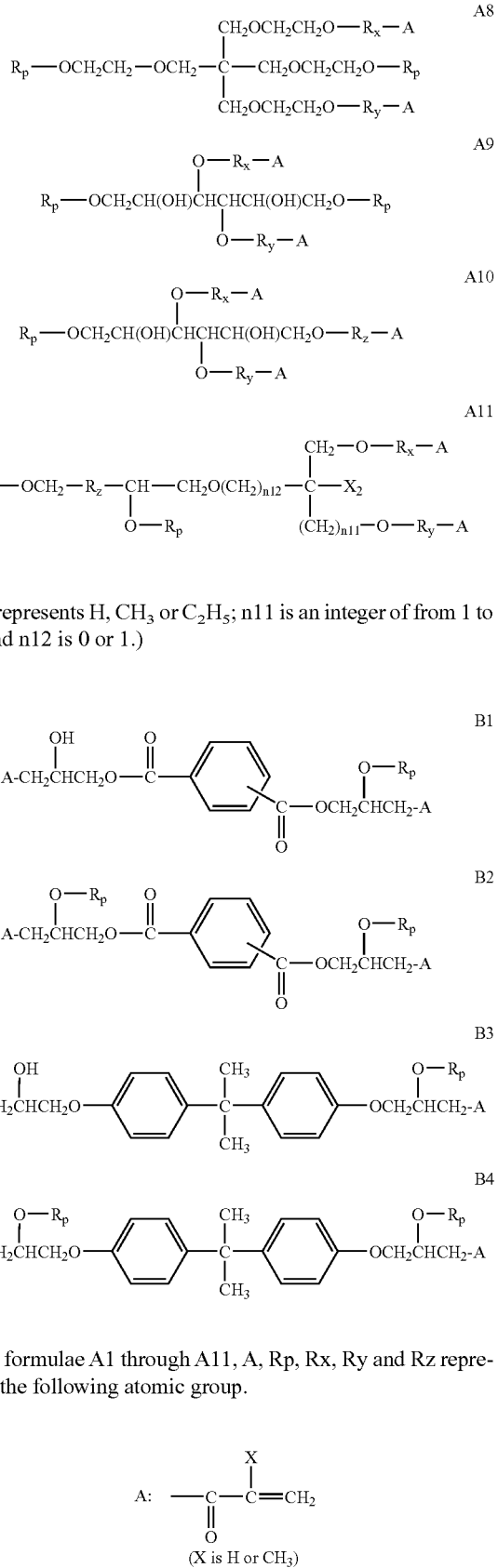

($X_2$ represents H, $CH_3$ or $C_2H_5$; n11 is an integer of from 1 to 5; and n12 is 0 or 1.)

In formulae A1 through A11, A, Rp, Rx, Ry and Rz represent the following atomic group.

Rx, Ry, Rz: —(CH$_2$CH$_2$O)n1- (site bonding to A) (in which n1 is an integer of from 0 to 5); or

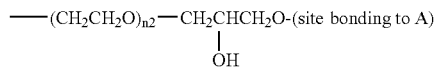

(in which n2 is an integer of from 0 to 5.)

Rp represents any one of the following formulae (1) through (5),

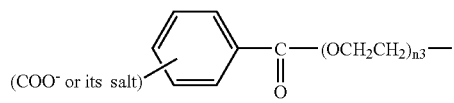

(1)

(in which n3 is an integer of from 0 to 5.)

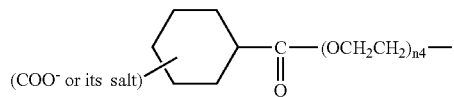

(2)

(in which n4 is an integer of from 0 to 5.)

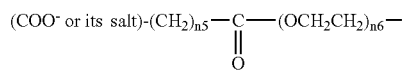

(3)

(in which n5 is an integer of from 2 to 6; and n6 is an integer of from 0 to 5.)

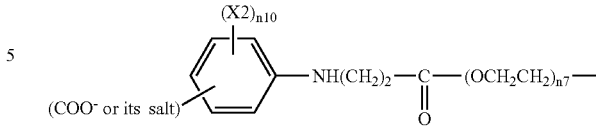

(4)

(in which n7 is an integer of from 0 to 5; n10 is an integer of from 1 to 4; and X2 represents a halogen atom, an alkoxy group or a nitro group.)

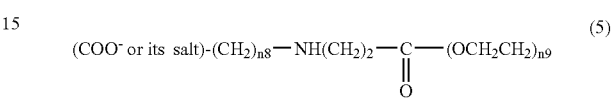

(5)

(in which n8 is an integer of from 1 to 6; and n9 is an integer of from 0 to 5.)

In formulae B1 through B4, A and Rp represent the following atomic group.

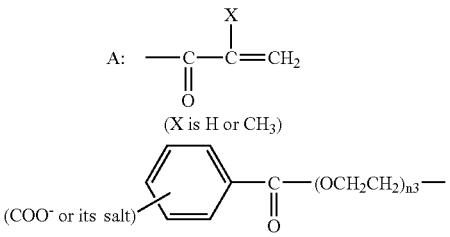

(in which n3 is an integer of from 0 to 5.); or

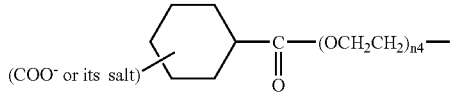

(in which n4 is an integer of from 0 to 5.)

Examples of the water-soluble polymerizable compound will be listed below.

A1-1

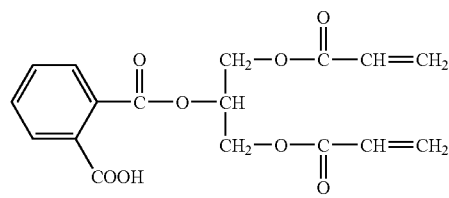

A1-2

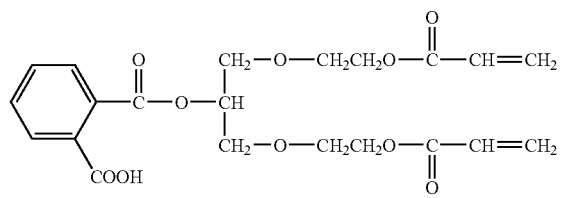

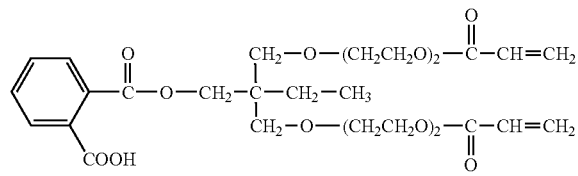

A3-1

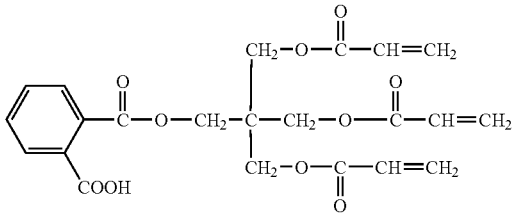

-continued
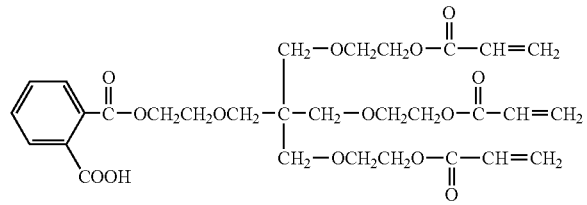
A3-2
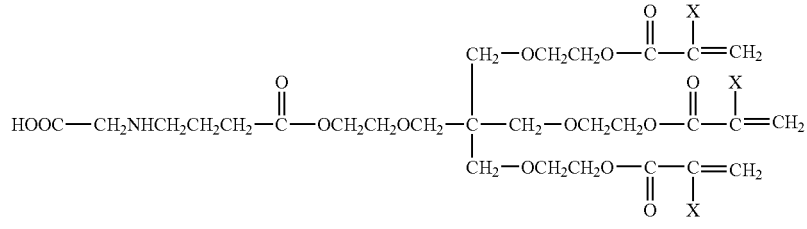
A3-3
(x represents H or —CH₃)
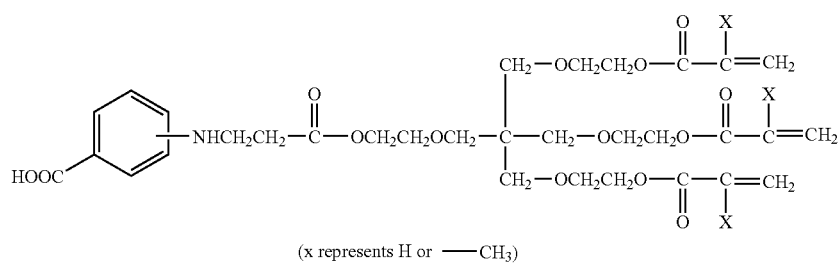
A3-4
(x represents H or —CH₃)
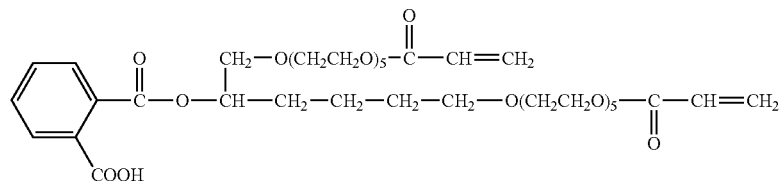
A4-1
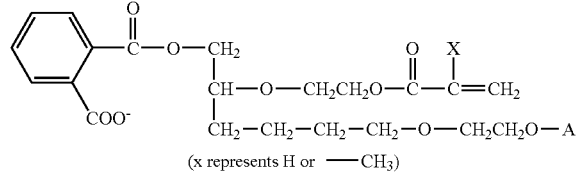
A5-1
(x represents H or —CH₃)
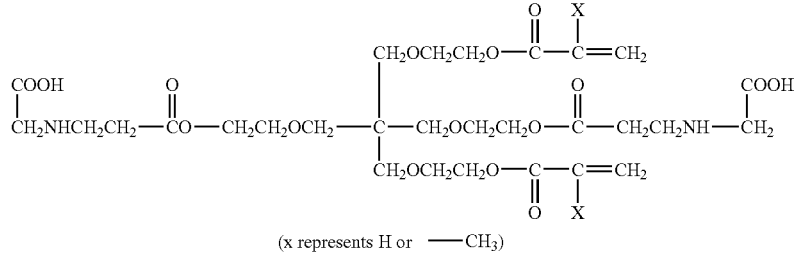
A8-1
(x represents H or —CH₃)

-continued
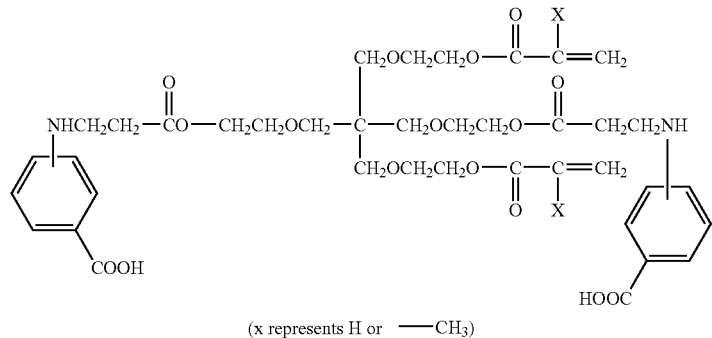
A8-2
(x represents H or —CH₃)
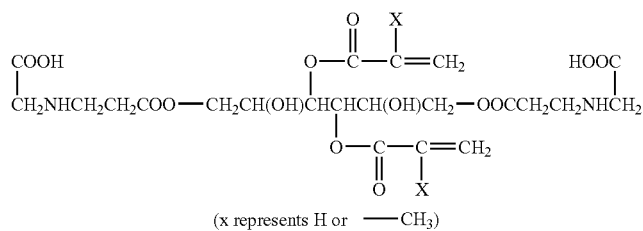
A9-1
(x represents H or —CH₃)
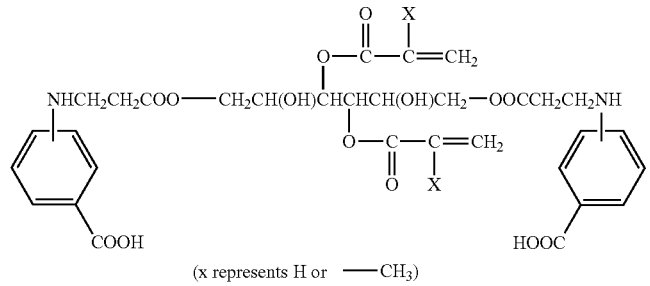
A9-2
(x represents H or —CH₃)
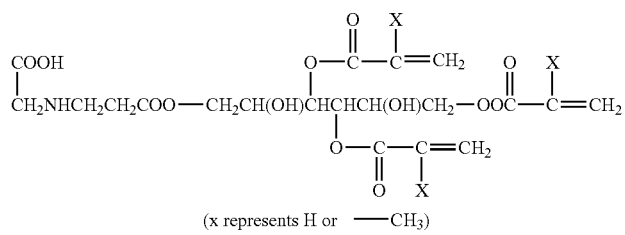
A10-1
(x represents H or —CH₃)
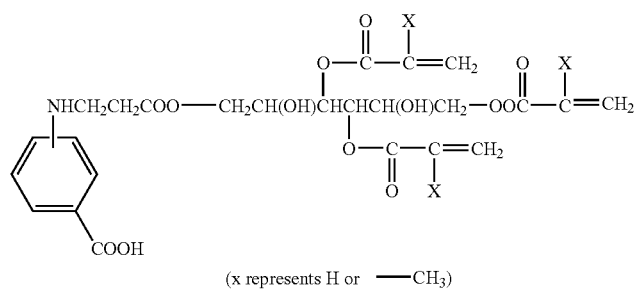
A10-2
(x represents H or —CH₃)

-continued
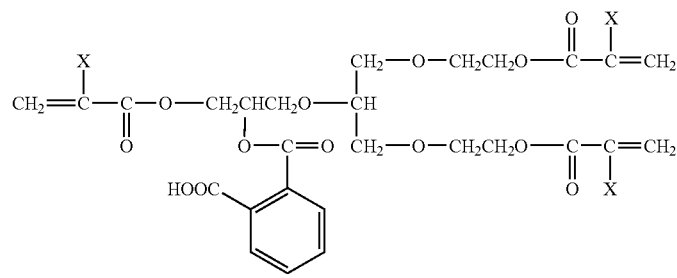
A11-1
(x represents H or ——CH₃)
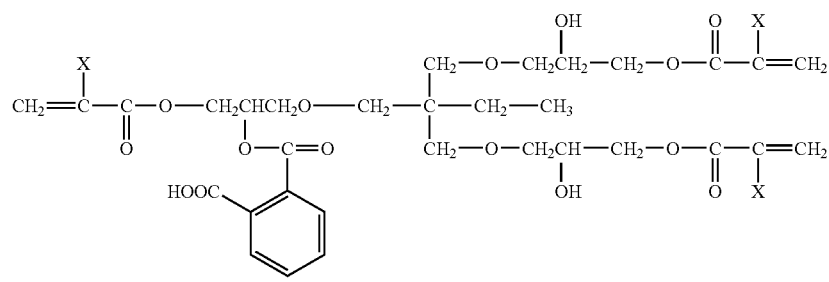
A11-2
(x represents H or ——CH₃)
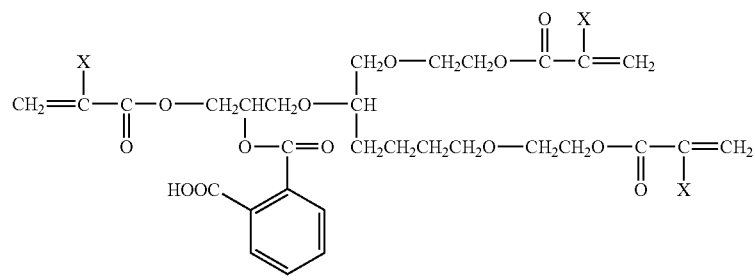
A11-3
(x represents H or ——CH₃)
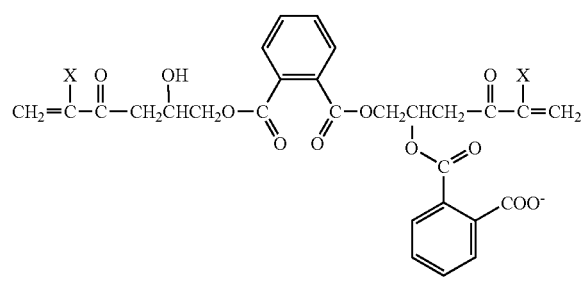
B1-1
(x represents H or ——CH₃)
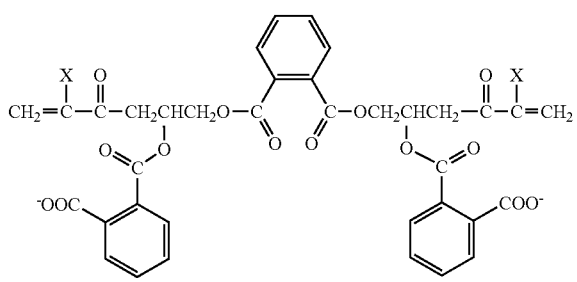
B2-1
(x represents H or ——CH₃)
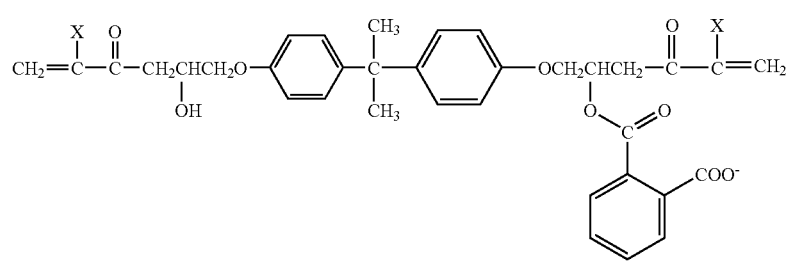
B3-1
(x represents H or ——CH₃)

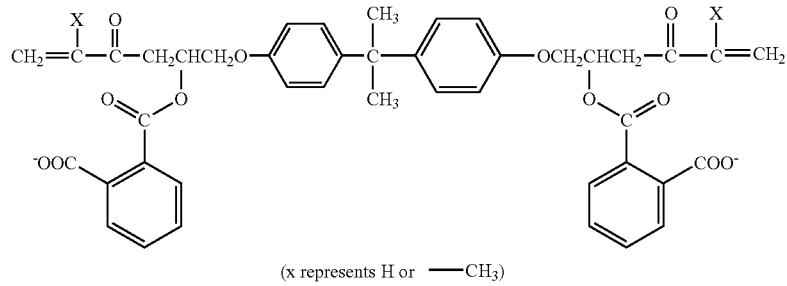

(x represents H or —CH₃)

Exemplified polymerizable compound A10 or A11 can be synthesized by a method reacting acrylic acid with an amine having a carboxyl group, i.e., amino acid. Examples of the amine having a carboxyl group used in this method include para-aminobenzoic acid, glycine, valine, leucine, isoleucine, serine, threonine, methionine, and phenylalanine. A compound having the same properties as the above compounds can be obtained from amino acid having two carboxyl groups such as gultamic acid or asparaginic acid.

Among the compounds described above, compounds having in the molecule three polymerizable functional groups are especially superior in polymerization rate, hardness of cured compounds, and water resistance. It is considered that compounds having in the molecule three or more reactive groups polymerize to produce a polymerization product with high cross-linking density, which greatly reduce the hydrophilicity.

Next, the water-soluble photopolymerization initiator in the invention will be explained.

The water-soluble photopolymerization initiator used in the invention is not specifically limited. As the water-soluble photopolymerization initiator, there is, for example, a catalyst which reacts on exposure of light having a wavelength of approximately 400 nm. As such a catalyst, there is, for example, a photopolymerization initiator represented by the following formula TX1, TX2 or TX3, which is sensitive to light having a longer wavelength, i.e., generates radicals on ultraviolet ray exposure. In the invention, one selected from these compounds is preferably used.

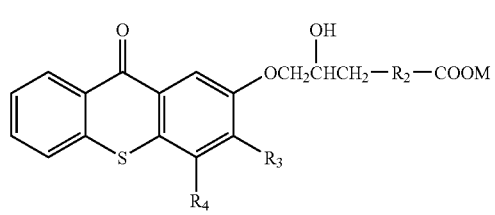

TX1

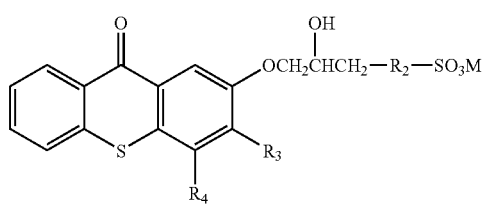

TX2

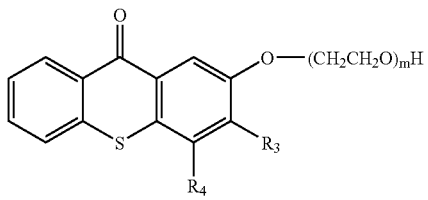

TX3

In formulae TX1, TX2, TX3, $R_2$ represents —$(CH_2)_x$— in which x is 0 or 1, —$O(CH_2)_y$— in which y is 1 or 2 or a substituted or unsubstituted phenylene group, provided that the phenylene group represented by $R_2$ may have one or more substituents selected from a carboxyl group, a carboxylate group, a sulfonic acid group, a sulfonate group, a straight-chained or branched alkyl group having a carbon atom number of from 1 to 4, a halogen atom (fluorine, chlorine, bromine etc.), an alkoxy group having a carbon atom number of from 1 to 4 and an aryloxy group such as a phenoxy group; M represents a hydrogen atom or an alkali metal (for example, Li, Na or K); $R_3$ and $R_4$ independently represent a hydrogen atom or a substituted or unsubstituted alkyl group; and m represents an integer of from 1 to 10. The alkyl group represented by $R_3$ and $R_4$ represents a straight chained or branched alkyl group having a carbon atom number of from 1 to 10, and preferably from 1 to 3. Substituents of the substituted alkyl group represented by $R_3$ and $R_4$ include a halogen atom (fluorine, chlorine, bromine etc.), a hydroxyl group and an alkoxy group having a carbon atom number of from 1 to 3.

The thioxanthones as described above having a hydrophilic atomic group have compatibility with anionic aqueous pigment dispersion, and act as highly sensitive catalyst in a pigment containing photocurable composition since organic pigment has less absorption.

As the water soluble photopolymerization initiator, which are contained in the aqueous photocurable resin composition in the invention, a water soluble derivative derived from a photopolymerization initiator Irgacure 2959 (produced by Ciba Specialty Chemicals Co.) represented by the following formula (IC) can be also use. Examples of the water soluble derivatives include compounds IC-1, IC-2 and IC-3 described later.

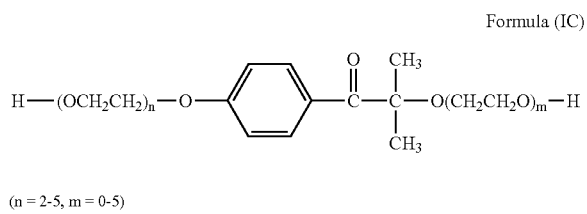

Formula (IC)

(n = 2-5, m = 0-5)

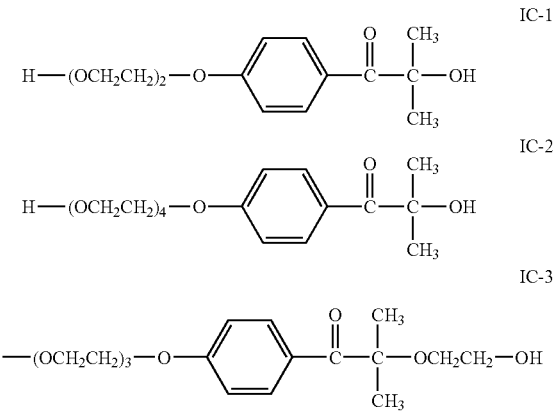

Compounds IC-1, IC-2, and IC-3 are nonionic, and the wavelength regions of ultraviolet light to which they are sensitive are shorter than those of ultraviolet light to which the photopolymerization initiators represented by formulae TX1, TX2, and TX3 described above are sensitive. Compounds IC-1, IC-2 and IC-3 are water soluble as the photopolymerization intiators represented by formulae TX1, TX2 and TX3, and are useful for a component constituting the aqueous UV curable color ink in the invention.

Next, components other than the above-described, which constitute the UV curable color ink in the invention, will be explained.

The UV curable color ink in the invention contains a colorant for coloration. Colorants, which are soluble or dispersible in the main components of the polymerizable compounds, can be used as the colorant. Pigments are preferred as the colorant in view of weather resistance.

Pigments preferably used in the invention will be listed below:

C.I. Pigment Yellow—1, 3, 12, 13, 14, 17, 42, 81, 83, 87, 95, 109, 120, 138, 139, 150, 180

C.I. Pigment Orange—16, 36, 38,

C.I. Pigment Red—5, 22, 38, 48:1, 48:2, 48:4, 49:1, 53:1, 57:1, 63:1, 101, 122, 144, 146, 185, 202, C.I. Pigment Violet—19, 23, C.I. Pigment Blue—15:1, 15:3, 15:4, 18, 27, 29, 60, C.I. Pigment Green—7, 36, C.I. Pigment White—6, 18, 21, C.I. Pigment Black—7, Further, in the invention, when white ink is utilized to increase a covering power of colors in a transparent substrate such as a plastic film, titanium oxide is preferably used as the white pigment. Anatase-type titanium oxide having a low specific gravity is more preferred in view of pigment segmentation.

To disperse the above-described pigment, for example, a ball mill, a sand mill, an attritor mill, a roll mill, an agitator, a Henshel mixer, a colloidal mixer, a ultrasonic homogenizer, a pearl mill, a wet jet mill, a paint shaker, etc. can be utilized. Further, a dispersant can be added at dispersion of a pigment. As a dispersant, a polymer dispersant is preferably utilized and Solsperse Series manufactured by Avecia Co. is included. Further, as a dispersion aid, a synergist coresponding to each kind of a pigment can also be utilized. The dispersant and dispersion aid are preferably added in a range of from 1 to 50 weight parts based on 100 parts of a pigment. As a dispersion medium, a solvent or a polymerizable compound is utilized, however, the water based actinic ray curable ink used in the invention is preferably an ink containing no solvent, since curing was carried out immediately after the ink was deposited on recording material. When a solvent is left in a cured image, there caused problems of deterioration of resistance against solvents and VOC of residual solvent.

Therefore, as a dispersion medium, polymerizable compounds are used but a solvent not. Particularly monomers having the lowest viscosity among them are preferably used in view of dispersion suitability.

In dispersion of a pigment, selection of a pigment, a dispersant and a dispersion medium, dispersion conditions and filtering conditions are suitably set so as to make a mean particle diameter of a pigment of preferably from 0.08 to 0.5 μm and the maximum particle diameter of from 0.3 to 10 μm and preferably from 0.3 to 3 μm. By this particle diameter control, it is possible to depress clogging of a head nozzle and maintain keeping stability of ink, as well as transparency and curing sensitivity of ink.

In ink according to the invention, colorant concentration is preferably from 1 to 10% weight based on the total ink.

Various additives other than the above-described can be added to the UV curable color ink in the invention. For example, a polymerization inhibitor is added in an amount of from 200 to 2000 ppm to the UV curable color ink in order to improve storage stability of the ink. Preferably, the UV curable color ink is heated to reduce the viscosity, and ejected from recording head nozzles. Accordingly, it is preferred that the polymerization inhibitor is added to the ink in preventing clogging of the nozzles due to thermal polymerization. Various compounds as the polymerization inhibitor are known, and those contained in a conventional polymerizable composition can be used.

As the polymerization inhibitor, phenol type anti-oxidants, amines, phosphor-containing anti-oxidants, hydroquinone monomethyl ether used in (meth)acrymers, hydroquinone, t-butylcatechol, pyrogallol or water can be used. These are described in detail in "Kobunshitenkazai no Kaihatsugijutsu" published by CMC Co., Ltd.

Besides additives other than those explained above, a leveling additive, a matting agent, polyester type resin, polyurethane type resin, vinyl type resin, acryl type resin, rubber type resin and wax series can be added to the UV curable color ink when necessary. A small amount of organic solvents are effectively added to the ink in order to improve adhesion to the substrate. It is effective that the organic solvent is added in such an amount that problem of solvent resistance or VOC does not occur. The organic solvent is added to the ink in an amount of from 0.1 to 5%, and preferably from 0.1 to 3%.

EXAMPLES

Next, the present invention will be explained employing examples, but the present invention is not limited thereto.

Example 1

<<Preparation of UV Curable Color Ink>>

[Preparation of Pigment Dispersion]

(Preparation of Yellow Pigment Dispersion)

C.I. Pigment Yellow 74 was dispersed in an aqueous medium containing an appropriate amount of water-soluble polyurethane (with a number average molecular weight of 3000) as a dispersant to obtain a yellow pigment dispersion containing pigment with an average particle size of 110 nm in an amount of 18% by weight.

(Preparation of Magenta Pigment Dispersion)

C.I. Pigment Magenta 122 was dispersed in an aqueous medium containing an appropriate amount of water-soluble polyurethane (with a number average molecular weight of 3000) as a dispersant to obtain a magenta pigment dispersion containing pigment with an average particle size of 90 nm in an amount of 14% by weight.

(Preparation of Cyan Pigment Dispersion)

C.I. Pigment Blue 15:3 was dispersed in an aqueous medium containing an appropriate amount of water-soluble polyurethane (with a number average molecular weight of 3000) as a dispersant to obtain a cyan pigment dispersion containing pigment with an average particle size of 75 nm in an amount of 15% by weight.

(Preparation of Black Pigment Dispersion)

C.I. Pigment Black 7 was dispersed in an aqueous medium containing an appropriate amount of water-soluble polyurethane (with a number average molecular weight of 3000) as a dispersant to obtain a black pigment dispersion containing pigment with an average particle size of 55 nm in an amount of 20% by weight.

[Preparation of Color Inks]

| (Yellow Ink) | |
|---|---|
| Yellow pigment dispersion (Pigment content of 18% by weight). | 19.4% by weight |
| Water-soluble polymerizable compound 1 | 4.0% by weight |
| Water-soluble polymerizable compound 2 | 13.0% by weight |
| Water-soluble photopolymerization initiator 1 | 0.5% by weight |
| Water | 63.1% by weight |

| (Magenta Ink) | |
|---|---|
| Magenta pigment dispersion (with a pigment content of 14% by weight) | 17.8% by weight |
| Water-soluble polymerizable compound 1 | 4.0% by weight |
| Water-soluble polymerizable compound 2 | 13.0% by weight |
| Water-soluble photopolymerization initiator 1 | 0.5% by weight |
| Water | 64.7% by weight |

| (Cyan Ink) | |
|---|---|
| Cyan pigment dispersion (with a pigment content of 15% by weight) | 20.0% by weight |
| Water-soluble polymerizable compound 1 | 4.0% by weight |
| Water-soluble polymerizable compound 2 | 13.0% by weight |
| Water-soluble photopolymerization initiator 1 | 0.5% by weight |
| Water | 62.5% by weight |

| (Black Ink) | |
|---|---|
| Black pigment dispersion (with a pigment content of 20% by weight) | 25.0% by weight |
| Water-soluble polymerizable compound 1 | 4.0% by weight |
| Water-soluble polymerizable compound 2 | 13.0% by weight |
| Water-soluble photopolymerization initiator 1 | 0.5% by weight |
| Water | 57.5% by weight |

Water-soluble polymerizable compound 1

Water-soluble polymerizable compound 2

Water-soluble photopolymerization initiator 1

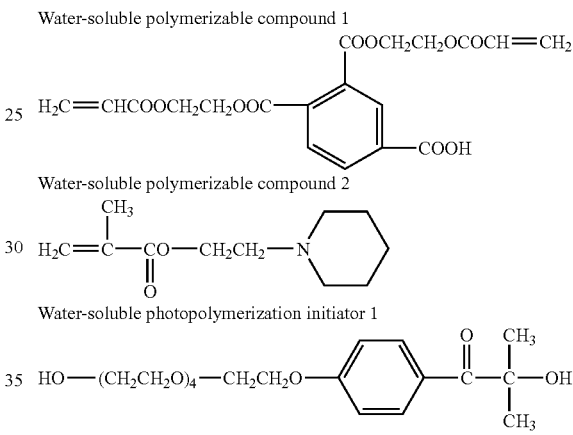

<<Preparation of UV Curable Transparent Ink>>

| Water-soluble polymerizable compound 1 | 4.0% by weight |
|---|---|
| Water-soluble polymerizable compound 2 | 13.0% by weight |
| Water-soluble photopolymerization initiator 1 | 0.5% by weight |
| Fluorine-containing nonionic surfactant | 0.1% by weight |
| Water | 82.4% by weight |

<<Image Recording<<

[Ink Jet Recording Apparatus]

The UV curable color inks and UV curable transparent ink prepared above was loaded in an ink jet recording apparatus as shown in FIG. 1 equipped with a recording head having a piezo-type ink jet nozzle, and an ultraviolet ray irradiation device Vzero Hbulb produced by Integration Corporation provided on both sides of the carriage, and image recording was performed on a non-absorptive polyvinyl chloride sheet whose surface is plasma treated. An ink supply system is comprised of an ink tank, a supply pipe, a pre-chamber ink tank directly before a recording head, a piping attached with a filter, and a piezo type recording head with a nozzle pitch of 360 dpi ejecting ink droplets of 14 pl. Thus, printing was carried out at a resolution of 720 dpi×720 dpi employing ink droplets providing a maximum of one dot per one pixel to form a solid image. The ink jet recording apparatus as shown in FIG. 1 is designed so that the number of printing passes can be varied to 2, 4 and 6, the scanning speed of the carriage can be varied, and amount of energy of ultraviolet rays to be irradiated to ink images can be varied.

After printing was finished, the resulting ink image was dried blowing hot air (80° C.) to remove moisture remaining in the image. The drying was carried out at 23° C. and 40% RH.

[Image Formation]

(Formation of Images 1 through 6)

A four color solid image was formed employing the yellow, magenta, cyan and black inks prepared above at a carriage scan speed and at UV irradiation output as shown in Table 1. Herein, the image formation was carried out under conditions that when ink amount necessary to form a solid image is 100%, the printing pass is 6 and total ink amount is 400%. Every time when one scan was completed, curing according to ultraviolet ray irradiation was carried out, and after all printing and ultraviolet ray irradiation were completed, drying was carried out with hot air (80° C.) to remove moisture remaining in the resulting image. Thus, Images 1 through 6 were formed.

(Formation of Images 7 and 8)

Image 7 was formed in the same manner as in Image 2, except that curing according to ultraviolet ray irradiation was carried at one time after 6 scans were completed. Image 8 was formed in the same manner as in Image 5, except that curing according to ultraviolet ray irradiation was carried at one time after 6 scans were completed.

(Formation of Images 9 through 12)

Images 9, 10, 11 and 12 were formed in the same manner as in Image 1, 2, 3, and 7, respectively, except that after 6 scans were completed, the resulting image was covered with a transparent solid image employing the UV curable transparent ink prepared above, the transparent ink amount necessary to cover the solid color image being 100%, and subjected to ultraviolet ray irradiation, followed by drying.

(Formation of Images 13 and 14)

Image 13 was formed in the same manner as in Image 2, except that the drying was not carried out. Image 14 was formed in the same manner as in Image 5, except that the drying was not carried out.

<<Measurement of Properties and Evaluations>>

[Measurement of Contact Angle]

Each of the resulting UV curable color inks was coated on a polyethylene terephthalate film through a wire bar to form an ink film with a thickness of 10 µm. Thus, four color ink specimens, yellow, magenta, cyan and black ink specimens were obtained. Each specimen was mounted on the ink jet recording apparatus as described above, and exposed to ultraviolet rays in the same manner as above to form a cured color ink film (cured color solid image). Subsequently, 20 µl of each of the UV curable color inks were dropped on each cured color solid image, and contact angle of each UV curable color ink to the cured color solid image was measured employing an automatic contact angle tester MODEL CA-V produced by Kyowa Interface Science Co., Ltd. Thus, the range of contact angle of UV curable color ink to the cured color solid image was determined.

[Measurement of Image Area Ratio]

In formation of the four color solid image as described above, ink was ejected onto a substrate at one scan to form an image on the substrate and exposed to ultraviolet rays the image to form a cured image, and image data of the resulting four color cured image was read through a CCD monitor, and the image area ratio was determined from the read image data.

[Evaluation of Anti-Bleeding Property]

In a similar manner as above, a red solid image was formed employing the yellow ink and the magenta ink, and a black Ming letter with a 4 point size and a black gothic letter with a 4 point size were printed on the red solid image employing the black ink. The resulting black letters were evaluated according to the following criteria:

A: The letter form of the resulting black Ming and gothic letters was clearly discriminated.

B: The letter form of the resulting black Ming and gothic letters was discriminated.

C: The letter form of the resulting black Ming and gothic letters was difficult to be discriminated, but the black Ming and gothic letters were legible as black letters.

D: Some of the resulting black Ming and gothic letters were illegible.

[Evaluation of Image Adhesion Property]

With respect to each image formed above, a cross-cut adhesion test was carried out according to a method as described in JIS K5400. Eleven cut lines at an interval of 1 mm were formed in the transverse and longitudinal directions on the image, to form a grid of one hundred 1 mm$^2$ squares. Sellotape (trade mark) was adhered to the image surface with the grid and sharply peeled off perpendicularly to the image surface (cross-cut adhesion test). Similarly, Sellotape was adhered to the image surface without cut lines, and sharply peeled off perpendicularly to the image surface (simple adhesion test). The solid image surface from which the Sellotape was peeled was observed, and evaluated according to the following criteria:

A: No peeling of any of the solid color images was observed at the cross-cut adhesion test.

B: Slight peeling of some of the solid color images was observed at the cross-cut adhesion test, but no peeling of any of the solid color images was observed at the adhesion test of uncut images.

C: Peeling of some of the solid color images was observed at the cross-cut adhesion test, but no peeling of any of the solid color images was observed at the adhesion test of uncut images.

D: Peeling of all the solid color images was observed at the cross-cut adhesion test and at the adhesion test of uncut images.

[Measurement of Reflection Density]

The specimen with four solid color images prepared as above was placed on a white sheet and the reflection density of the four solid color images was measured through a densitometer PDA-65 (produced by Konica Minolta Photo Imaging, Inc.).

A: Reflection density of all the solid color images was not less than 1.2.

B: Reflection density of two of the solid color images was not less than 1.2.

C: Reflection density of all the solid color images was from 1.0 to less than 1.2.

D: Reflection density of all the solid color images was less than 1.0.

[Evaluation of Glossiness]

Glossiness of each image formed above was visually observed by twenty skilled persons, and the average evaluation was ranked according to the following criteria:

A: The image has glaziness and excellent glossiness.
B: The image has glaziness and has good glossiness.
C: The image has poor glaziness but has glossiness.
D: The image has poor glossiness.

[Evaluation of Chroma]

Chroma of each image formed above was visually observed, and evaluated according to the following criteria:
A: The image has high chroma, and is highly brilliant and sharp.
B: The image has high chroma, and is brilliant and sharp.
C: The image has a little low chroma, but is practically acceptable.
D: The image has insufficient chroma, and is not sharp.

The results are shown in Table 1.

TABLE 1

| Image No. | Carriage Scan Speed (mm/s) | UV Irradiation Output (W/cm) | UV Curable Transparent Ink | Drying | Remarks |
|---|---|---|---|---|---|
| 1 | 100 | 120 | No | Yes | Comp. |
| 2 | 200 | 120 | No | Yes | Inv. |
| 3 | 300 | 120 | No | Yes | Inv. |
| 4 | 100 | 80 | No | Yes | Inv. |
| 5 | 200 | 80 | No | Yes | Inv. |
| 6 | 300 | 80 | No | Yes | Inv. |
| 7 | 200 | 120 | No | Yes | Comp. |
| 8 | 200 | 80 | No | Yes | Comp. |
| 9 | 100 | 120 | Yes | Yes | Comp. |
| 10 | 200 | 120 | Yes | Yes | Inv. |
| 11 | 300 | 120 | No | Yes | Inv. |
| 12 | 200 | 120 | No | Yes | Comp. |
| 13 | 200 | 120 | No | No | Inv. |
| 14 | 200 | 80 | No | No | Inv. |

| Image No. | Range of Contact Angle (°) | *1 (%) | *2 | *3 | *4 | *5 | *6 | Remarks |
|---|---|---|---|---|---|---|---|---|
| 1 | 52-63 | 90 | B | B | D | D | D | Comp. |
| 2 | 41-48 | 90 | A | B | C | C | C | Inv. |
| 3 | 36-46 | 86 | A | A | B | B | B | Inv. |
| 4 | 35-48 | 95 | A | B | B | B | B | Inv. |
| 5 | 32-44 | 92 | A | A | B | B | B | Inv. |
| 6 | 24-39 | 86 | A | A | A | B | B | Inv. |
| 7 | — | 90 | D | D | B | D | D | Comp. |
| 8 | — | 92 | D | D | B | D | D | Comp. |
| 9 | 52-63 | 90 | B | B | D | C | C | Comp. |
| 10 | 41-48 | 90 | A | B | B | A | A | Inv. |
| 11 | 36-46 | 86 | A | A | B | A | A | Inv. |
| 12 | — | 90 | D | D | B | D | D | Comp. |
| 13 | 41-48 | 90 | B | C | C | C | C | Inv. |
| 14 | 32-44 | 92 | B | C | B | C | C | Inv. |

Comp.: Comparative,
Inv.: Inventive,
*1: Image Area Ratio of Four-Color Solid Image after One Pass,
*2: Anti-bleeding Property,
*3: Image Adhesion Property,
*4: Reflection Density,
*5: Glossiness,
*6: Chroma Images 7 and 8, in which ultraviolet ray irradiation was carried at one time after all printing were completed, were high in density but poor in anti-bleeding property and image adhesion property. Since in the formation of these images, ink was ejected by continuous six scans without curing, contact angle of the ink to the finally cured image surface was less than 10°, which resulted in poor anti-bleeding property. Further, since ultraviolet ray irradiation was carried at one time after the total amount (400%) of ink was ejected, the ultraviolet ray intensity was insufficient at the interface between the substrate and the ink image, which resulted in insufficient curing and poor image adhesion property.

Image 1, wherein an ink image was exposed to ultraviolet rays every scan to form a cured ink image so that the contact angle exceeded 50°, lowered image density, glossiness and chroma. However, Images 2 through 6, wherein an ink image was exposed to ultraviolet rays every scan to form a cured ink image so that the contact angle was in the range of 10 to 50° by optimizing the carriage scan speed and ultraviolet ray intensity, provided excellent anti-bleeding property, excellent image adhesion, high density, high glossiness and high chroma. Further, provision of the UV curable colorless ink in the invention further improved glossiness and chroma. As compared Images 2 and 5 with Images 13 and 14, provision of drying further improved glossiness and chroma.

Example 2

Images 15, 16, 17 and 18 were formed in the same manner as in Image 3 (formed at a carriage scan speed: 300 mm/s and a UV irradiation output of 120 W/cm) of Example 1, except that the total ink was 400%, and the scan pass number was varied as shown in Table 2. Image 17 was formed in the same manner as in Image 3 of Example 1. The resulting images were evaluated in the same manner as in Example 1, except for contact angle. The results are shown in Table 2.

TABLE 2

| Image No. | Carriage Scan Speed (mm/s) | UV Irradiation Output (W/cm) | Scan Number (Pass Number) | Ink Eject Amount per one pass (%) |
|---|---|---|---|---|
| 15 | 300 | 120 | 2 | 200 |
| 16 | 300 | 120 | 4 | 100 |
| 17 | 300 | 120 | 6 | 66.7 |
| 18 | 300 | 120 | 8 | 50 |

| Image No. | Image ratio (%) | Anti-bleeding property | Image Adhesion Property | Reflection Density | Glossiness | Chroma |
|---|---|---|---|---|---|---|
| 15 | 100 | C | C | B | B | B |
| 16 | 100 | B | B | B | B | B |
| 17 | 86 | A | A | B | B | B |
| 18 | 72 | A | A | B | B | B |

As is apparent from Table 2, images, which were formed under conditions that the image area ratio (image ratio) at the first scan was less than 100% and the ink amount per one scan was less than 100%, further improved anti-bleeding property and image adhesion property, maintaining high density, high glossiness and high chroma.

What is claimed is:

1. An image recording method comprising the steps of:
    ejecting a first water-based UV curable color ink onto a non-absorptive substrate to form a first color ink image on the non-absorptive substrate;
    exposing to ultraviolet rays the first color ink image to form a first UV cured color ink image;
    ejecting a second water-based UV curable color ink onto the first UV cured color ink image to form a second color ink image on the first UV cured color ink image; and
    exposing to ultraviolet rays the second color ink image to form a second UV cured color ink image, wherein a static contact angle of the second water-based UV curable color ink to the first UV cured color ink image is in the range of from 10 to 50°.

2. The image recording method of claim 1, wherein formation of the first and second color ink images is carried out at one printing scan.

3. The image recording method of claim 1, wherein when the ink amount necessary to form a solid image is 100%, the total amount of the first and second UV curable color inks is less than 100%.

4. The image recording method of claim 1, wherein an image area ratio of the first UV cured color ink image is less than 100%.

5. The image recording method of claim 1, further comprising the step of drying the second UV cured color ink image to remove moisture remaining therein.

6. The image recording method of claim 1, further comprising the steps of ejecting a water-based UV curable colorless ink onto the second UV cured color ink image to form a colorless ink image on the second UV cured color ink image; and exposing to ultraviolet rays the colorless ink image.

7. The image recording method of claim 6, comprising the steps of:
ejecting a first water-based UV curable color ink onto a non-absorptive substrate to form a first color ink image on the non-absorptive substrate;
exposing to ultraviolet rays the first color ink image to form a first UV cured color ink image;
ejecting a water-based UV curable colorless ink onto the first UV cured color ink image to form a colorless ink image on the first UV cured color ink image; and
exposing to ultraviolet rays the colorless ink image.

8. The image recording method of claim 1, wherein the first water-based UV curable color ink is the same as the second water-based UV curable color ink.

* * * * *